United States Patent
Schulten

(10) Patent No.: US 6,200,914 B1
(45) Date of Patent: Mar. 13, 2001

(54) ELECTRICALLY POORLY CONDUCTIVE MATERIAL FOR PRODUCING AN INSULATION SLEEVE

(75) Inventor: Michael Schulten, Bochum (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/246,746

(22) Filed: Feb. 8, 1999

Related U.S. Application Data

(63) Continuation of application No. PCT/DE97/01613, filed on Jul. 30, 1997.

(30) Foreign Application Priority Data

Aug. 7, 1996 (DE) .............................. 196 31 897

(51) Int. Cl.⁷ .............................. B32B 27/04; B32B 27/12
(52) U.S. Cl. ...................... 442/111; 428/319.1; 428/408; 428/922; 106/284.05; 361/216; 361/220; 361/221
(58) Field of Search .................... 442/111; 428/319.1, 428/408, 922; 106/284.05; 361/216, 220, 221

(56) References Cited

U.S. PATENT DOCUMENTS

| | | | |
|---|---|---|---|
| 2,341,219 | * 2/1944 | Jones ...................... 117/46 |
| 2,427,700 | 9/1947 | Atkinson et al. . |
| 3,132,065 | * 5/1964 | Barsy et al. . |
| 3,891,880 | 6/1975 | Britsch . |
| 4,091,139 | 5/1978 | Quirk . |
| 4,166,193 | * 8/1979 | Schmidt et al. ........................ 174/28 |
| 4,322,253 | * 3/1982 | Panvoke et al. ...................... 148/1.5 |
| 4,392,011 | * 7/1983 | Panvoke et al. ...................... 136/261 |
| 4,520,380 | * 5/1985 | Ovshinsky et al. ...................... 357/2 |
| 4,749,636 | 6/1988 | Iino et al. . |
| 5,223,327 | * 6/1993 | Bihy et al. ............................ 428/195 |
| 5,466,917 | * 11/1995 | Matsuki et al. ....................... 219/730 |
| 5,656,406 | * 8/1997 | Ikuno et al. ............................ 430/67 |
| 5,738,963 | * 4/1998 | Niino ..................................... 430/57 |
| 5,763,905 | * 6/1998 | Harris ..................................... 257/77 |
| 5,939,230 | * 8/1999 | Kojima et al. .......................... 430/57 |

FOREIGN PATENT DOCUMENTS

| | | |
|---|---|---|
| 1021062 | 12/1957 | (DE) . |
| 1092529 | 11/1961 | (DE) . |
| 1160938 | 1/1964 | (DE) . |
| 3935865C1 | 10/1990 | (DE) . |
| 3316693C2 | 7/1991 | (DE) . |
| 4218928A1 | 12/1993 | (DE) . |
| 1106010 | * 8/1965 | (GB) .................................... 442/111 |

* cited by examiner

Primary Examiner—Terrel Morris
Assistant Examiner—Arti R. Singh
(74) Attorney, Agent, or Firm—Herbert L. Lerner; Laurence A. Greenberg; Werner H. Stemer

(57) ABSTRACT

An electrically poorly conductive material for producing external glow-discharge protection for an electrical conductor, includes a base material which is provided with a conductive coating on at least one side. In order to ensure adequate external glow-discharge protection and cost-effective production of an insulating sleeve, even for high rated voltages, the conductive coating is produced essentially from carbon, which has microcrystalline and amorphous structures.

14 Claims, 1 Drawing Sheet ically from glass fibers. The conductive coating 2 is produced substantially of carbon, and has microcrystalline and amorphous structures. The structures are graphite grids which have been disturbed by the incorporation of extraneous oxygen and hydrogen atoms. The conductive coating 2 is produced by plasma deposition. The conductive coating 2 is semiconductive, and has a specific electrical resistance in a range from $10^5$–$10^{16}$ Ωcm. A coating thickness of the conductive coating 2 is in a range from 5 nm–4 μm.

ELECTRICALLY POORLY CONDUCTIVE MATERIAL FOR PRODUCING AN INSULATION SLEEVE

CROSS-REFERENCE TO RELATED APPLICATION

This application is a continuation of copending International Application No. PCT/DE97/01613, filed Jul. 30, 1997, which designated the United States.

BACKGROUND OF THE INVENTION

Field of the Invention

The invention relates to an electrically poorly conductive material for producing external glow-discharge protection for an electrical conductor having a high-voltage winding, the material including a base which is provided with a conductive coating on at least one side.

Such a material is disclosed in German Published, Prosecuted Patent Application 1 021 062. In that case, an electrically conductive silicone-rubber coating is applied to a base sheet web. The conductivity of that coating is achieved by additively mixing soot or graphite to the silicone-rubber which has not been vulcanized. A disadvantage of that known material is that a coating of the material must be wound ½-overlapped and must be vulcanized in order to produce an external glow-discharge protection for insulators with high rated voltages, which is costly and time-consuming.

German Published, Prosecuted Patent Application 1 092 529 discloses a further material for producing an insulating sleeve. In order to ensure improved external glow-discharge protection, a porous base material is used, which is made electrically conductive by impregnation with a solution of a suitable metal salt. Disadvantageously, that material cannot be used for production by machine using the total-immersion technique which can be carried out easily and cost-effectively.

SUMMARY OF THE INVENTION

It is accordingly an object of the invention to provide an electrically poorly conductive material for producing an insulation sleeve, which overcomes the hereinafore-mentioned disadvantages of the heretofore-known materials of this general type, which ensures adequate external glow-discharge protection even at high rated voltages and which allows a cost-effective production thereof.

With the foregoing and other objects in view there is provided, in accordance with the invention, an electrically poorly conductive material for producing external glow-discharge protection for an electrical conductor, the material comprising a base having sides; and a conductive coating disposed on at least one of the sides of the base, the conductive coating produced substantially of carbon having microcrystalline and amorphous structures.

Advantageously, the use of the electrically poorly conductive material according to the invention allows improved external glow-discharge protection to be achieved at high rated voltages, and thus allows simplified production of an insulating sleeve.

In accordance with another feature of the invention, the structures have graphite grids disturbed by the incorporation of extraneous oxygen and hydrogen atoms. Such structures, which also occur in soot, can be produced deliberately by plasma deposition. The ratio of microcrystalline and amorphous structures can be varied in this case depending on the method control procedure. It is thus possible to influence the electrical and mechanical characteristics of the conductive coating.

In accordance with a further feature of the invention, the conductive coating is semiconductive. The specific electrical resistance of the conductive coating in this case is expediently in a range from $10^5$–$10^{16}$ Ωcm. This allows particularly effective external glow-discharge protection.

In accordance with an added feature of the invention, the coating thickness of the conductive coating is preferably in a range from 5 nm–4 μm. Coatings of such a size exhibit very good adhesion and at the same time, they are flexible. Furthermore, they have good stability with respect to environmental influences such as moisture.

In accordance with an additional feature of the invention, the base is produced from a porous material, which may be formed essentially from glass fibers. Glass-fiber matting or similar materials are particularly suitable for use as the material. The base is preferably constructed as a strip. The use of such a base allows external glow-discharge protection to be produced by using the cost-effective immersion method.

In accordance with yet another feature of the invention, it is particularly advantageous that the electrical conductivity of the conductive coating increases across its thickness and/or in the longitudinal direction of the strip. Thus, when used for external-glow-discharge protection of generator winding elements, it is possible to achieve a continuously reducing conductivity from the center of a bar to involutes. The continuous potential reduction which results from this structure results in there being is no electrically highly loaded transitional region from external to end glow-discharge protection.

In accordance with a concomitant feature of the invention, conductivity which reduces from the center of the bar to the involutes is produced particularly cost-effectively by the electrical conductivity of the conductive coating increasing in the longitudinal direction of the strip from the ends of the strip toward the center of the strip.

Other features which are considered as characteristic for the invention are set forth in the appended claims.

Although the invention is illustrated and described herein as embodied in an electrically poorly conductive material for producing an insulation sleeve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a diagrammatic, cross-sectional view of a material according to the invention.

DESCRIPTION OF THE PREFERRED EMBODIMENTS

Figure 1:
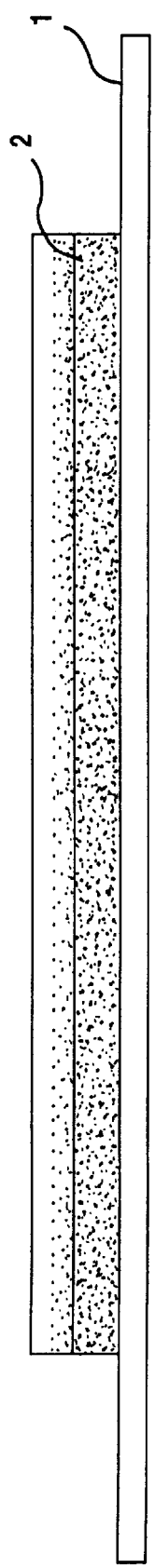

Referring now in detail to the single FIGURE of the drawing, there is seen an electrically poorly conductive material that includes a base 1 on which a conductive coating 2 is applied. The base 1 is a strip produced from porous material. The porous material is produced substantially from glass fibers. The conductive coating 2 is produced substantially of carbon having microcrystalline and amorphous structures. The structures have graphite grids disturbed by an incorporation of extraneous oxygen and hydrogen atoms. The electrical conductivity of the coating 2 decreases from the base 1 outward, as is indicated graphically by shading of the coating 2 reducing towards the exterior. The electrical conductivity of the coating 2 may increase across its thickness and/or in longitudinal direction of the strip and/or from ends towards the center of the strip. The conductive coating 2 is semiconductive and has a specific electrical resistance in a range from $10^5$–$10^{16}$ Ωcm. The conductive coating 2 has a coating thickness in a range from 5 nm–4 μm.

I claim:

1. An electrically poorly conductive material for producing external glow-discharge protection for an electrical conductor, the material comprising:

a base having sides; and a conductive coating disposed on at least one of said sides of said base, said conductive coating produced substantially of carbon having microcrystalline and amorphous structures.

2. The electrically poorly conductive material according to claim 1, wherein said structures have graphite grids disturbed by an incorporation of extraneous oxygen and hydrogen atoms.

3. The electrically poorly conductive material according to claim 1, wherein said conductive coating is semiconductive.

4. The electrically poorly conductive material according to claim 3, wherein said conductive coating has a specific electrical resistance in a range from $10^5$–$10^{16}$ Ωcm.

5. The electrically poorly conductive material according to claim 1, wherein said conductive coating has a coating thickness in a range from 5 nm–4 μm.

6. The electrically poorly conductive material according to claim 1, wherein said base is produced from porous material.

7. The electrically poorly conductive material according to claim 6, wherein said porous material is produced substantially from glass fibers.

8. The electrically poorly conductive material according to claim 1, wherein said base is a strip.

9. The electrically poorly conductive material according to claim 8, wherein said conductive coating has an electrical conductivity increasing in longitudinal direction of said strip.

10. The electrically poorly conductive material according to claim 8, wherein said conductive coating has a thickness and an electrical conductivity increasing across said thickness and in longitudinal direction of said strip.

11. The electrically poorly conductive material according to claim 1, wherein said conductive coating has a thickness and an electrical conductivity increasing across said thickness.

12. The electrically poorly conductive material according to claim 1, wherein said strip has ends and a center, and said conductive coating has an electrical conductivity increasing in longitudinal direction of said strip from said ends towards said center.

13. The electrically poorly conductive material according to claim 1, wherein a ratio of microcrystalline and amorphous structures is a pre-determined ratio.

14. The electrically poorly conductive material accordingly to claim 1, wherein a ratio of microcrystalline and amorphous structures is a certain ratio.

* * * * *